United States Patent
Bhoopathy

(12) 
(10) Patent No.: US 6,716,141 B2
(45) Date of Patent: Apr. 6, 2004

(54) MECHANICALLY ACTUATED SCOOTER

(76) Inventor: Suresh Babu M. Bhoopathy, 1232 Taft, Irvine, CA (US) 92620

( * ) Notice: Subject to any disclaimer, the term of this patent is extended or adjusted under 35 U.S.C. 154(b) by 102 days.

(21) Appl. No.: 09/859,169

(22) Filed: May 16, 2001

(65) Prior Publication Data

US 2002/0173409 A1 Nov. 21, 2002

(51) Int. Cl.$^7$ ................................................ A63B 71/00
(52) U.S. Cl. ..................... 482/51; 280/221; 280/254; 280/257; 74/143
(58) Field of Search ............................ 482/51; 280/221, 280/200, 209, 210, 252–261; 74/143, 141.5, 142, 126

(56) References Cited

U.S. PATENT DOCUMENTS

| | | |
|---|---|---|
| 1,477,544 A | 12/1923 | D'Antonio |
| 1,653,889 A | 12/1927 | Clark |
| 2,062,830 A | 12/1936 | Sabaeff |
| 2,086,445 A * | 7/1937 | Smith ..................... 280/221 |
| 3,415,540 A | 12/1968 | Portnoff |
| D293,340 S | 12/1987 | Heilig |
| 4,828,284 A * | 5/1989 | Sandgren ..................... 482/51 |
| 5,224,719 A | 7/1993 | Goodspeed |
| 5,368,321 A * | 11/1994 | Berman et al. ............. 280/221 |
| 6,382,043 B1 * | 5/2002 | Lin ............................. 74/354 |
| 6,402,173 B1 * | 6/2002 | Chiu ......................... 280/252 |

FOREIGN PATENT DOCUMENTS

WO    WO 99/22980    5/1999

OTHER PUBLICATIONS

PCT Application (WO 99/22980) Peak, Malcolm, A Personal Vehicular Accesory, May 1999.*

* cited by examiner

*Primary Examiner*—Nicholas D. Lucchesi
*Assistant Examiner*—Tam Nguyen
(74) *Attorney, Agent, or Firm*—James G O'Neill; Klein O'Neill & Singh, LLP

(57) ABSTRACT

A mechanized scooter includes a frame, having a front wheel and at least one rear wheel rotatably attached thereto. A pair of steps are rotatably mounted in the frame and linked to a drive train to drive the at least one rear wheel. The drive train may include a number of gears and a drive element connected to a rack, or drive chains and sprockets secured to the at least one rear wheel.

3 Claims, 2 Drawing Sheets

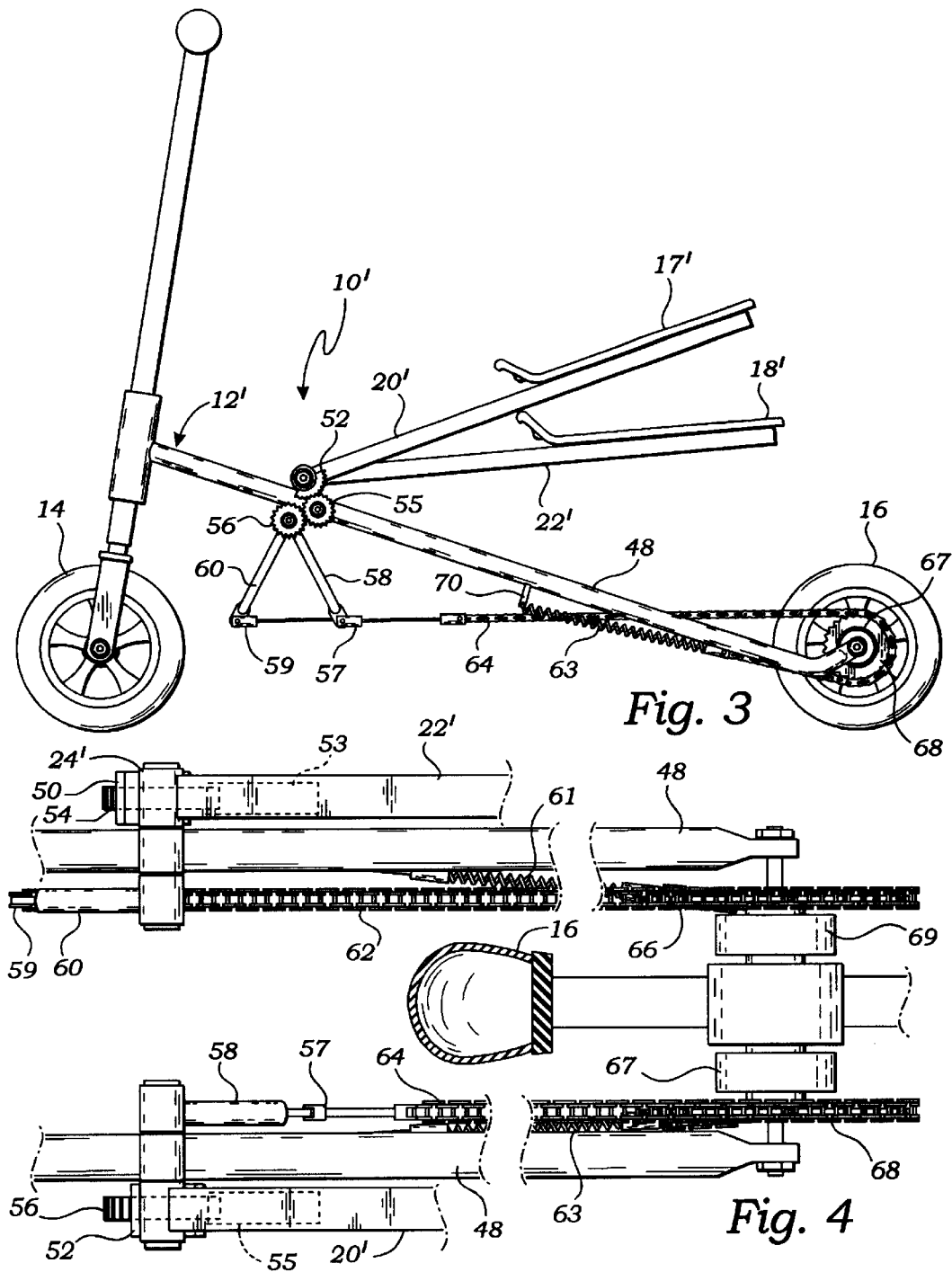

MECHANICALLY ACTUATED SCOOTER

BACKGROUND OF THE INVENTION

1. Technical Field

The invention relates generally to vehicles and particularly, to a mechanically actuated scooter, having a pair of steps to drive one or more rear wheels of the scooter.

2. Description of the Prior Art

The use of two-wheeled scooters is an activity performed by many people for a variety of reasons. Using a scooter is an enjoyable pastime, and it is good exercise. The degree of exercise is determined by the distance traveled, and the type of terrain traversed. Finally, using a scooter is environmentally friendly transportation, causing no toxic by-products, other than the carbon dioxide expelled from the user's lungs.

However, using a scooter is limited by the ability and/or stamina of the rider. Some people cannot or do not enjoy propelling a scooter with a foot, while others become tired, making the use of a scooter an unpleasant task. Further, a rider is often deterred from attempting to ride in hilly terrain, for fear that he might become tired and be forced to either end the ride or complete the ride beyond the point of exhaustion. Additionally, many persons, because of age, infirmities, or the like, cannot propel a scooter or keep their balance while attempting to use the scooter.

Several variations on the basic scooter concept have been developed over the years, in an effort to retain some of the benefits of such riding, while eliminating the drawbacks. In particular, motor actuated scooters, both electric and gasoline power, have been developed.

Such motorized scooters give the rider the thrill of outdoor riding, while eliminating the necessity to push off with their feet or a foot. Thus, the rider can tackle hilly terrain, and travel in other inaccessible areas. When compared with cars and motorcycles such scooters produce considerably less pollution. However, motorized scooters require an engine that may cause pollution or require charging, and can be hard to handle for some people.

Some pedal actuated scooters have been developed as a further attempt at providing a substitute for regular scooters. However, the scooters are limited, in that they are hard to operate, or clumsy, and are not acceptable to all persons.

Therefore, there exists a need in the art for an improved mechanically actuated scooter, that is easier to use, while providing exercise and enjoyment.

SUMMARY OF THE INVENTION

It is an object of the invention to produce a mechanized vehicle utilizing a modified scooter frame that allows the scooter to be mechanically powered, by the use of pedals.

It is another object of the invention to produce a mechanized scooter that is economical to manufacture. Accordingly, the mechanical powered scooter of the present invention employs a pair of steps that are linked to at least one rear wheel.

It is a further object of the invention to provide a mechanized scooter that is easy to operate. Accordingly, a pair of steps are provided to drive a rear wheel through a chain drive or a gear train.

The present invention is a mechanically actuated scooter, using a modified or standard scooter frame, having a front wheel and at least one rear wheel attached thereto, together with a pair of pedals or steps to drive the at least one rear wheel. The pedals are linked to a drive means to alternately drive the at least one rear wheel.

BRIEF DESCRIPTION OF THE DRAWINGS

The objects and features of the present invention, which are believed to be novel, are set forth with particularity in the appended claims. The present invention, both as to organization and manner of operation, together with further objects and advantages, may best be understood by reference to the following description, taken in conjunction with the accompanying drawings, in which:

FIG. 3 is a side elevational view of a second embodiment of a mechanized scooter of the instant invention having gear driven levers operating chain drive means connected to a rear wheel; and FIG. 4 is an enlarged partial cross-sectional view of the chain drive to the rear wheel of FIG. 3.

DESCRIPTION OF THE PREFERRED EMBODIMENTS

The following description is provided to enable any person skilled in the art to make and use the invention, and sets forth the best modes contemplated by the inventor of carrying out his invention. Various modifications, however, will remain readily apparent to those skilled in the art, since the generic principals of the present invention have been defined herein, specifically to provide for a novel and improved mechanized scooter, utilizing a modified or standard scooter frame, with pedals or steps to drive the rear wheel.

Figure 1:
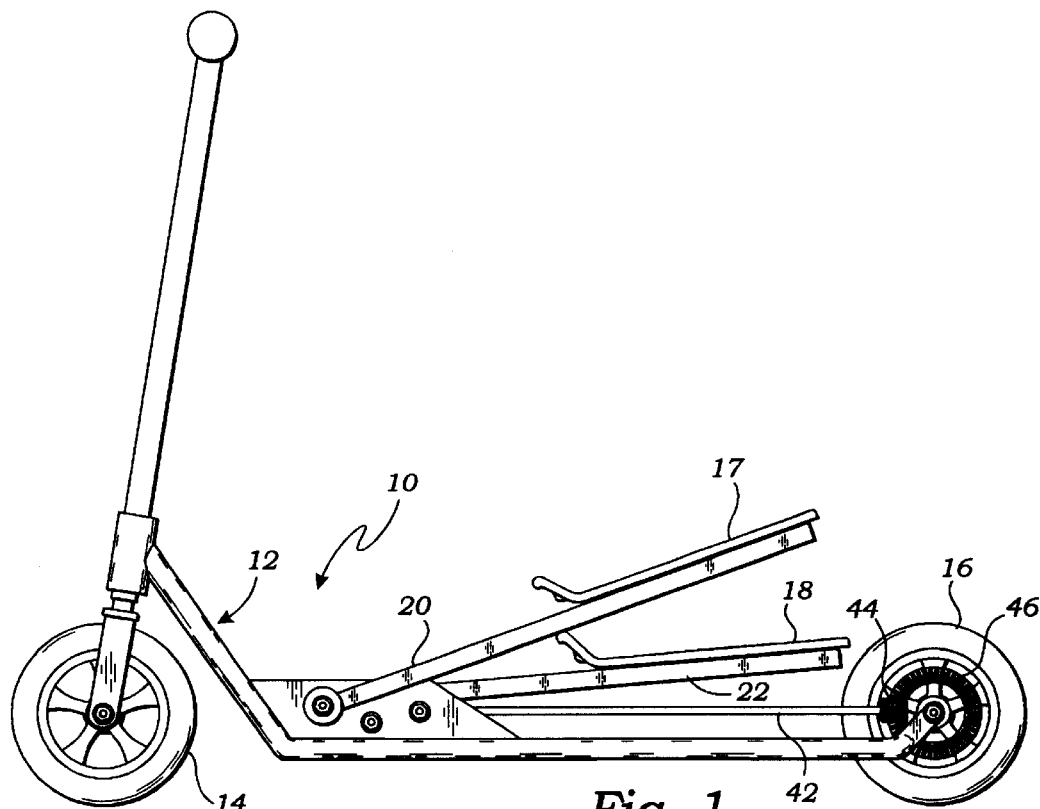
FIG. 1 is a side elevational view of a first embodiment of a mechanized scooter of the instant invention having a pair of pedals and a gear train to drive a rear wheel.

Turning now to FIG. 1, there illustrated is a first embodiment of a mechanized scooter 10 of the present invention. The mechanized scooter 10 comprises a frame assembly 12, which may be modified or of standard construction, having a front wheel 14 and at least one rear wheel 16 rotatably secured thereto. The wheels 14, 16 may be of any desired size.

In accordance with the present invention, as seen clearly in FIG. 1, a pair of pedals or steps 17, 18 are rotatably mounted on the scooter frame 12, as by means of bars or rods 20, 22 connected, as by a clutch or free-wheeling means 24, 26 at opposite ends of a shaft 28 having a drive gear or pinion 30 secured thereon. A seat may be placed on the scooter frame. A drive train 29 is comprised of the drive gear 30 that engages with a plurality of further gears 32, 34, 36, 38, 40 to rotate an elongated drive shaft 42, which may be in, above or below the frame, has a further gear 44 meshing with a circular rack 46, secured rear wheel 16, to rotate the rear wheel. The drive shaft 42 may be replaced by a chain, or the number of gears, and the number of teeth thereon may vary, depending on the ratio of the gears to each other, and the desired mechanical advantage required from a particular drive train. Additionally, the drive train may be placed in any desired position and a gear shifting mechanism may be placed on a handle or the frame 12, to shift one or more gears in the drive train 29. The frame may also be provided with a hinge to allow the scooter 10 to be folded.

Upon actuation of the pedals or steps 17, 18, by a person sitting or standing on the scooter, one of the pedals will move downwardly, toward the frame 12, to actuate drive train 29, causing rotation of the rear wheel and propelling the mechanized scooter 10 laterally. At the same time, the other step will move upwardly, away from the frame 12, in a free-wheel or non-driving manner.

Figure 2:
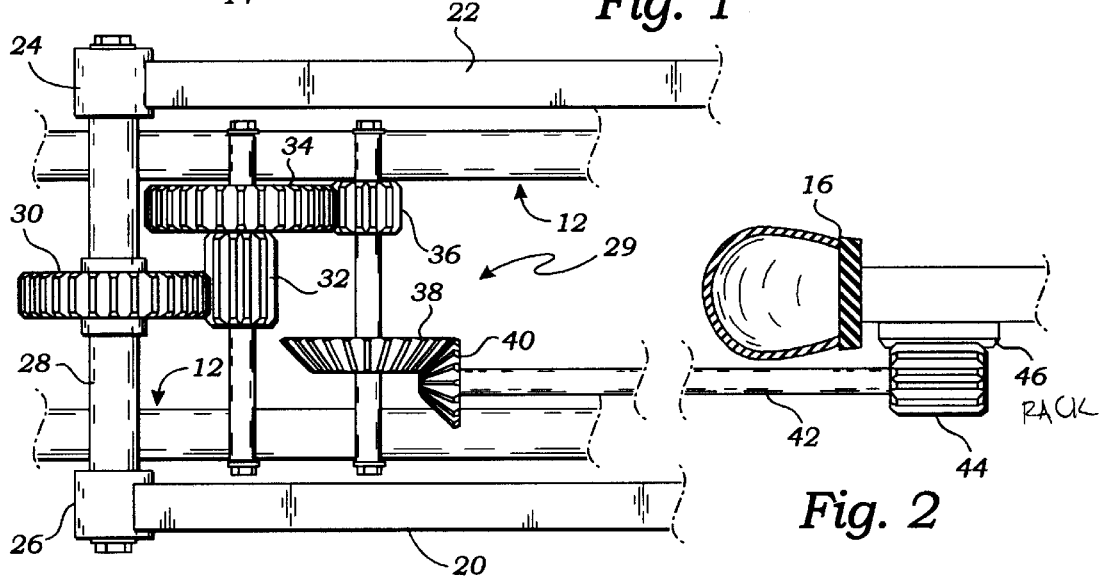
FIG. 2 is an enlarged partial cross-sectional view of the drive train that transmits power from the pedals of the scooter shown in FIG. 1, to the rear wheel.

FIGS. 3 and 4 show a further embodiment of the mechanized scooter 10', of the present invention. In this embodiment, a frame 12', may be similar to that shown in FIGS. 1 and 2, or may be formed or modified to include a pair of angled supports 48 having pedals or step 17', 18' rotatably mounted thereon by bars or rods 20', 22'. The bars or rods 20', 22' are rotatably secured to the supports 48 and have a pair of curved partial drive gears 50, 52 secured thereto. The fan-shaped, partial drive gears 50, 52, in turn, are connected to and drive gears 53, 55, which in turn actuate gears 54, 56, held or supported by supports 48. The gears 54, 56 have links 58, 60 attached thereto, either on the inside or outside thereof. The links 58, 60 are connected to any desired drive means, such as partial chains 62, 64 to transmit power from the steps 17', 18' to the rear wheel 16 via sprockets 66, 68 connected to free-wheel elements 67, 69 on either side of the rear wheel. A first end of each of the partial chains 62, 64 are secured to the links 58, 60 by pivotable connecting means 57, 59, while the other or second end of each partial chain is connected to a spring 61, 63, secured to the angled supports 48, as by means of pins, such as 70.

The scooter 10' would be operated in substantially the same way as described above. That is, a user would sit or stand on the scooter 10' and alternately press on the pedals to operate the rear wheel 16. The only difference would be that the pedals or steps 17', 18' drive gears to operate links that alternately drive partial chains to rotate sprockets attached to one or more rear wheels 16.

It therefore can be seen that there have been presented a number of mechanized scooters, which are lightweight and easy to handle, and which provide the convenience of powering a scooter by pedaling or stepping, while seated or standing. Numerous variations of the present invention are possible while adhering to the principles of the invention. Such variations are contemplated as being a part of the present invention and set forth in the appended claims.

What is claimed is:

1. A mechanized scooter, comprising:
    a frame assembly having a steerable front wheel and at least one rear wheel secured to the frame assembly for rotary motion thereof;
    a pair of steps having stepping portions at first ends; the pair of steps being rotatably mounted at a pivot point in the frame assembly, adjacent to the steerable front wheel, at second ends in the frame assemblies at second ends, removed from the stepping portions, for vertical motion between the frame assembly and a raised position above the frame assembly;
    a drive shaft connected between the second ends;
    free wheel means connected between the drive shaft and the second ends; and
    a drive gear secured to the drive shaft and connected to drive means connected to the at least one rear wheel, to rotate the at least one rear wheel upon vertical movement of the pair of steps downwardly, toward the frame assembly.

2. The mechanized scooter of claim 1, wherein the drive means includes a plurality of gears and a drive element, and the at least one rear wheel is operated by a gear connected to the drive element.

3. A mechanized scooter comprising:
    a frame assembly having a steerable front wheel and at least one rear drive wheel secured to the frame for rotary motion of the steerable front wheel and at least one rear drive wheel;
    a pair of steps rotatably mounted on the frame assembly at a pivot point on the frame assembly adjacent to the steerable front wheel for vertical movement between the frame assembly and a raised position, away from the frame assembly;
    the pair of steps having elongated elements with stepping portions at first ends raised above the frame assembly and second ends secured to free-wheeling connections in the frame assembly on opposed ends of a drive means; and
    a drive train operatively connected between the drive means and the at least one rear drive wheel; the drive train including a drive gear secured to the drive means, a plurality of gears secured between the drive gear and an elongated drive element, and the elongated drive element including a pinion driving a circular rack secured to the at least one rear drive wheel, to rotate the at least one rear drive wheel upon vertical movement of the pair of steps downwardly toward the frame assembly.

\* \* \* \* \*